United States Patent
Bergman et al.

(10) Patent No.: US 12,026,751 B2
(45) Date of Patent: Jul. 2, 2024

(54) METHOD AND APPARATUS FOR MONITORING USAGE OF A LIGHTING SYSTEM

(71) Applicant: SIGNIFY HOLDING B.V., Eindhoven (NL)

(72) Inventors: Anthonie Hendrik Bergman, Nuenen (NL); Dirk Valentinus René Engelen, Heusden-Zolder (BE); Bartel Marinus Van De Sluis, Eindhoven (NL); Berent Willem Meerbeek, Veldhoven (NL); Jochen Renaat Van Gheluwe, Lommel (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 682 days.

(21) Appl. No.: 16/603,368

(22) PCT Filed: Mar. 27, 2018

(86) PCT No.: PCT/EP2018/057696
§ 371 (c)(1),
(2) Date: Oct. 7, 2019

(87) PCT Pub. No.: WO2018/184899
PCT Pub. Date: Oct. 11, 2018

(65) Prior Publication Data
US 2021/0090151 A1   Mar. 25, 2021

(30) Foreign Application Priority Data
Apr. 6, 2017 (EP) .................................. 17165185

(51) Int. Cl.
*G05B 15/02* (2006.01)
*G06F 3/01* (2006.01)
(Continued)

(52) U.S. Cl.
CPC ......... *G06Q 30/0271* (2013.01); *G05B 15/02* (2013.01); *G06F 16/27* (2019.01); *G06Q 30/0631* (2013.01); *H05B 47/19* (2020.01)

(58) Field of Classification Search
CPC ........... G06Q 30/0271; G06Q 30/0631; G06F 16/27; H05B 47/19; G05B 15/02
See application file for complete search history.

(56) References Cited

U.S. PATENT DOCUMENTS

2015/0032505 A1   1/2015  Kusukame et al.
2015/0120246 A1*  4/2015  Shrubsole .............. G01R 31/44
                                                       702/182
(Continued)

FOREIGN PATENT DOCUMENTS

WO     2013186670 A2   12/2013
WO     2014163715 A1   10/2014

OTHER PUBLICATIONS

Khalili, Amir Hossein, Chen Wu, and Hamid Aghajan. "Hierarchical preference learning for light control from user feedback." 2010 IEEE Computer Society Conference on Computer Vision and Pattern Recognition-Workshops. IEEE, 2010. (Year: 2010).*

(Continued)

*Primary Examiner* — Mohsen Almani (57) ABSTRACT

A processor (21) receives an output from at least one component (3, 5, 6) of a lighting system (2), the output indicating usage of the lighting system (2) by a user. The processor (21) accesses a database (40) of available lighting system products. The processor (21) selects a lighting system product from the database (40) in view of the usage of the lighting system (2) by the user. The processor (21) arranges for an indication of the selected lighting system product to be provided to the user.

11 Claims, 4 Drawing Sheets

(51) Int. Cl.
  *G06F 16/27* (2019.01)
  *G06Q 30/0251* (2023.01)
  *G06Q 30/0601* (2023.01)
  *H04M 1/72415* (2021.01)
  *H05B 47/19* (2020.01)

(56) References Cited

U.S. PATENT DOCUMENTS

| | | |
|---|---|---|
| 2015/0127170 A1 | 5/2015 | Quam et al. |
| 2015/0278912 A1 | 10/2015 | Melcher et al. |
| 2016/0227633 A1 | 8/2016 | Sun et al. |
| 2016/0335698 A1 | 11/2016 | Jones et al. |
| 2016/0371762 A1 | 12/2016 | Fergis et al. |
| 2017/0027045 A1 | 1/2017 | Chemel |

OTHER PUBLICATIONS

Bhavani, R. Gomathi, and Maya Mohan. "Awareness on lighting energy saving and user satisfaction in residential and office buildings." International Conference on Biological, Civil and Environmental Engineering (BCEE-2014), Dubai (UAE). 2014. (Year: 2014).*

Ibyun, Jinsung, et al. "Intelligent household LED lighting system considering energy efficiency and user satisfaction." IEEE Transactions on Consumer Electronics 59.1 (2013): 70-76. (Year: 2013).*

Boyce, Peter R., et al. "Occupant use of switching and dimming controls in offices." Lighting Research & Technology 38.4 (2006): 358-376. (Year: 2006).*

* cited by examiner

METHOD AND APPARATUS FOR MONITORING USAGE OF A LIGHTING SYSTEM

CROSS-REFERENCE TO PRIOR APPLICATIONS

This application is the U.S. National Phase application under 35 U.S.C. § 371 of International Application No. PCT/EP2018/057696, filed on Mar. 27, 2018, which claims the benefit of European Patent Application No. 17165185.4, filed on Apr. 6, 2017. These applications are hereby incorporated by reference herein.

TECHNICAL FIELD

The present disclosure relates to a method and apparatus for monitoring usage of a lighting system.

BACKGROUND

US2016/335698A1 discloses a process of estimating electricity and financial savings which may be obtained by exchanging existing light bulbs to energy efficient light bulbs. The process allows a user to select bulbs to replace and to purchase those bulbs.

WO2013/186670A2 discloses a method for gathering operating information from a lighting product in an embedded persistent memory unit, which data may be used, for example, to select and display a range of suitable replacement lighting products.

Lighting systems are becoming increasingly sophisticated. The user is provided with a large number of options for controlling the lighting system. For example, a user may be able to control not only the brightness of a particular light source, but also the color/color temperature of the light source. Moreover, the controller that is used to control the lighting system itself can be complex and have sophisticated software running on it.

SUMMARY

According to a first aspect disclosed herein, there is provided a method of monitoring usage of a lighting system using apparatus comprising a processor, the method comprising:

the processor receiving an output from at least one component of a lighting system, the output indicating usage of the lighting system by a user;

the processor accessing a database of available lighting system products;

the processor selecting a lighting system product from the database in view of the usage of the lighting system by the user; and the processor arranging for an indication of the selected lighting system product to be provided to the user.

In this way, improvements to a lighting system can be recommended or proposed to a user, with the recommendation or proposal being based on usage of the lighting system by the user. This can be done in a way that avoids the user having to know the full details of what can be a complex system, and without the user having to know full technical details of new or replacement products that might be available. The indication that is provided may comprise an indication of the product itself and also the advantage(s) for the user over the user's current system and/or current products which the new or different product would provide.

The processor may be associated with some control device which is used by the user to control the lighting system. Alternatively, the processor may be associated with some server which may be local to or remote from the user. As another alternative, some aspects may be implemented by a processor of a control device which is used by the user or a server that is local to the users and other aspects may be implemented by a processor of a server that is remote from the user.

In an example, the component comprises at least one of a luminaire, a lamp on/off controller, a lamp dimmer controller and a lamp color controller.

In an example, the processor receives data concerning the context in which the usage of the lighting system takes place. In an example, the data concerning the context in which the usage of the lighting system takes place comprises at least one of user activity, number of users present, user location, time of day, and focus vector of the user. The user location may including optionally physical environment characteristics. In an example, the processor determines a time when to provide the indication to the user on the basis of at least the data concerning the context in which the usage of the lighting system takes place, the processor arranging for the indication of the selected lighting system product to be provided to the user at the determined time.

In an example, the usage of the lighting system indicates that the user frequently (e.g. more than a predetermined number of times or more than a predetermined percentage of the time) sets a light source dimmer control to a maximum or a minimum setting, and the processor arranges for an indication to be provided to the user of a light source that provides a greater maximum output or a lesser minimum output respectively.

In an example, the usage of the lighting system indicates that the user is attempting to select a color to be rendered by the lighting system that is not a color that can be rendered by the lighting system (e.g. the color cannot be rendered at all by the lighting system, the color cannot be rendered by all of the lighting devices in the lighting system or the color cannot be rendered at a selected light intensity), and the processor arranges for an indication to be provided to the user of a light source that will allow the selected color to be rendered.

In an example, the usage of the lighting system indicates that the user is attempting to select a color scene to be rendered by the lighting system, and the processor arranges for an indication to be provided to the user of a light source that will allow the selected color scene to be rendered. For example, a user may be interested in specific lighting scenes and the processor can provide an indication of one or more suitable lighting products to achieve the desired lighting scene. As one specific example, a user may frequently use wake up light scenes and so is recommended a bed room or wake up luminaire. As another specific example, as user may frequently attempt to find or use rich light scenes, such as a sunrise or rainbow effect, and the processor can arrange recommendation of a pixelated luminaire or light strip which will help achieve this.

In an example, the selecting a lighting system product comprises selecting a lighting system product that will provide a more power-efficient usage of the lighting system.

According to a second aspect disclosed herein, there is provided apparatus for monitoring usage of a lighting system, the apparatus comprising a processor arranged to:

receive an output from at least one component of a lighting system, the output indicating usage of the lighting system by a user;

access a database of available lighting system products;
select a lighting system product from the database in view of the usage of the lighting system by the user; and
arrange for an indication of the selected lighting system product to be provided to the user.

In an example, the processor is arranged to receive data concerning the context in which the usage of the lighting system takes place. In an example, the processor is arranged to determine a time when to provide the indication to the user on the basis of at least the data concerning the context in which the usage of the lighting system takes place, the processor arranging for the indication of the selected lighting system product to be provided to the user at the determined time.

In an example, the usage of the lighting system indicates that the user frequently sets a light source dimmer control to a maximum or a minimum setting, and the processor arranges for an indication to be provided to the user of a light source that provides a greater maximum output or a lesser minimum output respectively.

In an example, the usage of the lighting system indicates that the user is attempting to select a color to be rendered by the lighting system that is not a color that can be rendered by the lighting system, and the processor arranges for an indication to be provided to the user of a light source that will allow the selected color to be rendered.

In an example, the processor is arranged such that the selecting a lighting system product comprises selecting a lighting system product that will provide a more power-efficient usage of the lighting system.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

A luminaire is a device or structure arranged to emit light suitable for illuminating an environment, providing or substantially contributing to the illumination on a scale adequate for that purpose. A luminaire comprises at least one light source or lamp, such as an LED-based lamp, gas-discharge lamp or filament bulb, etc., plus any associated support, casing or other such housing. A luminaire may take a number of forms, including for example a ceiling or wall mounted luminaire, a free standing luminaire (e.g. a table lamp), and an illumination source built into a surface or an item of furniture. As mentioned, a user may be able to control not only the brightness of a particular light source, but also for example the color and/or color temperature of the light source.

In addition, luminaires are increasingly "connected", that is, the luminaire can be controlled by a separate control device, in addition to or instead of the traditional on/off switch, dimmer switch, photo detector switch, etc., and may be connected to each other. The separate control device may connect with the luminaires using a wired connection or a wireless connection or a mixture of wired and wireless connections. Suitable control devices include for example a smartphone, tablet, laptop computer, desktop computer or wireless wall-switch. Luminaires may also be controlled, additionally or alternatively, on the basis of sensor readings received from one or more remote sensors and/or by a controller provided directly on the luminaire.

Figure 1:
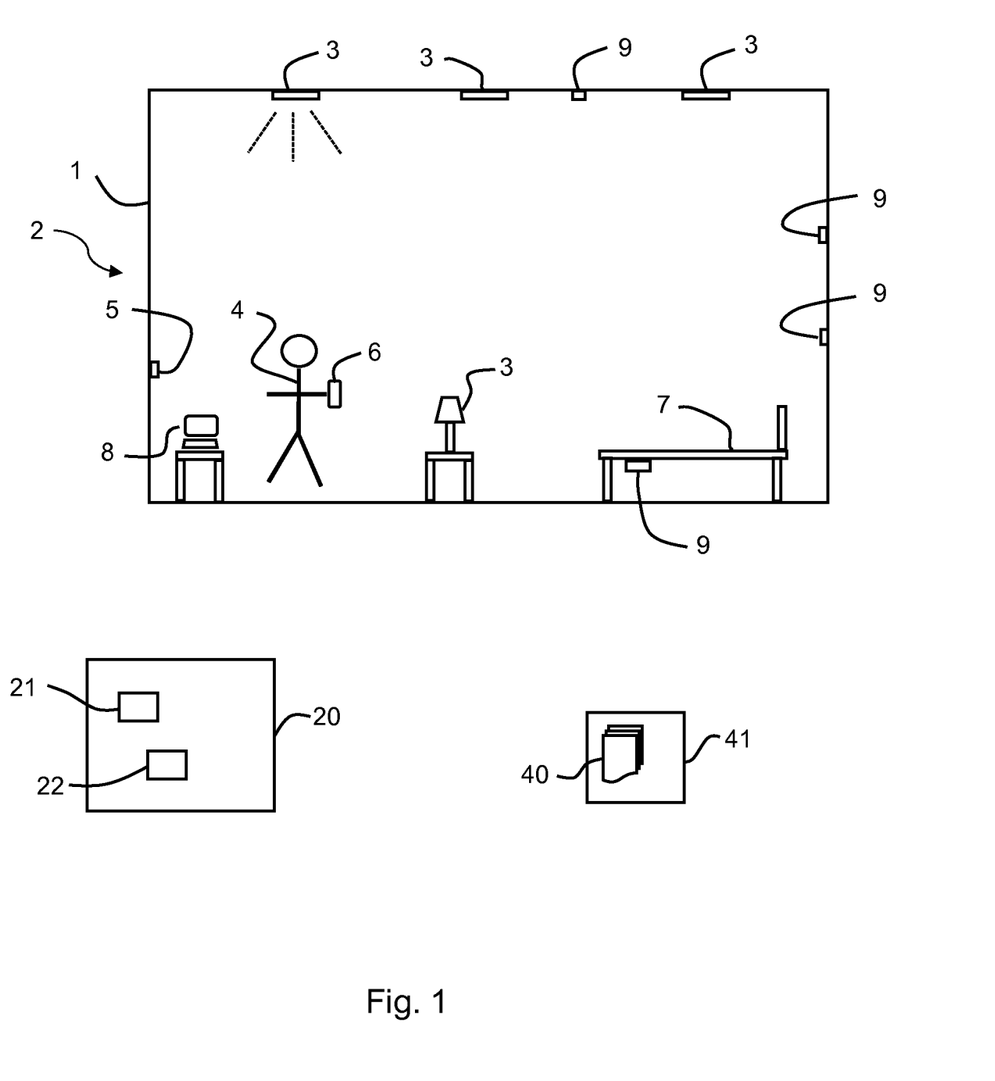
FIG. 1 shows schematically an example of a lighting system and related components.

Referring to FIG. 1, there is shown schematically an example of an overall system according to aspects described herein. There is shown an environment, such as a room 1, in which a lighting system 2 is fitted. The lighting system 2 has one or more luminaires 3. Examples of luminaires 3 shown are a table lamp and a number of ceiling-mounted light fittings. Other luminaires may be provided instead or in addition, including for example wall-mounted luminaires and luminaires that are built into a surface of for example an item of furniture or other equipment in the room.

A user 4 is able to control operation of the luminaires 3. The user 4 may be able to control the luminaires 3 using one or more wall-mounted or other fixed control devices 5. Alternatively or additionally, the user 4 may be able to control the luminaires 3 using a separate control device 6. The control device 6 may include or be a stand-alone interface, such as for example a cellular telephone, a smartphone, a home computer, a laptop computer, a tablet, a personal digital assistant (PDA), a computing device, a wearable device such as a smart watch, etc. Alternatively or additionally, the control device 6 may include or be an interface that is built into an appliance or other device, such as for example a television, a refrigerator, a security system, a game console, a browser, or the like. As yet further alternatives, the control device 6 may be voice or gesture activated. For convenience, the control device 6 is able to communicate with the luminaires 3 via a wireless connection, using an appropriate wireless protocol, such as for example Zigbee™, Bluetooth™ and/or WiFi™ signals, or using for example infrared (IR) signals. The control device 6 may communicate directly with the luminaires 3 and/or may communicate with the luminaires 3 via a bridge (not shown).

There is also shown schematically and by way of example other objects in the room 1, including furniture (for example, a bed 7) and a computer or television 8. There is also shown schematically and by way of example one or more sensors 9, which may be of different types and which will be discussed further below.

The lighting system 2 is in communication with a server 20. The server 20 may be a computer and may have a processor 21, data storage 22, etc. The server 20 may be local to the lighting system 2 or may be remote from the lighting system 2. The server 20 may for example be a computer or the like that is located at the same location as the lighting system 2. Indeed, the server 20 may even be part of or associated with the control device 6. In the case that the server 20 is remote from the lighting system 2, the lighting system 2 may be in communication with the server 20 via for example one or more of a cellular communications system and the internet. The server 20 may be operated by for example a supplier of components of the lighting system 2. The server 20 is able to receive at least outputs from the one or more sensors 9.

The server 20 is also in communication with a database 40. The database 40 may be local to the server 20 or, more typically, will be remote from the server 20. The database 40 may be hosted on a database server 41. The database 40 may be constituted by several discrete databases which may be hosted on separate database servers 41. The database 40 stores details concerning available products for lighting systems.

Figure 2:
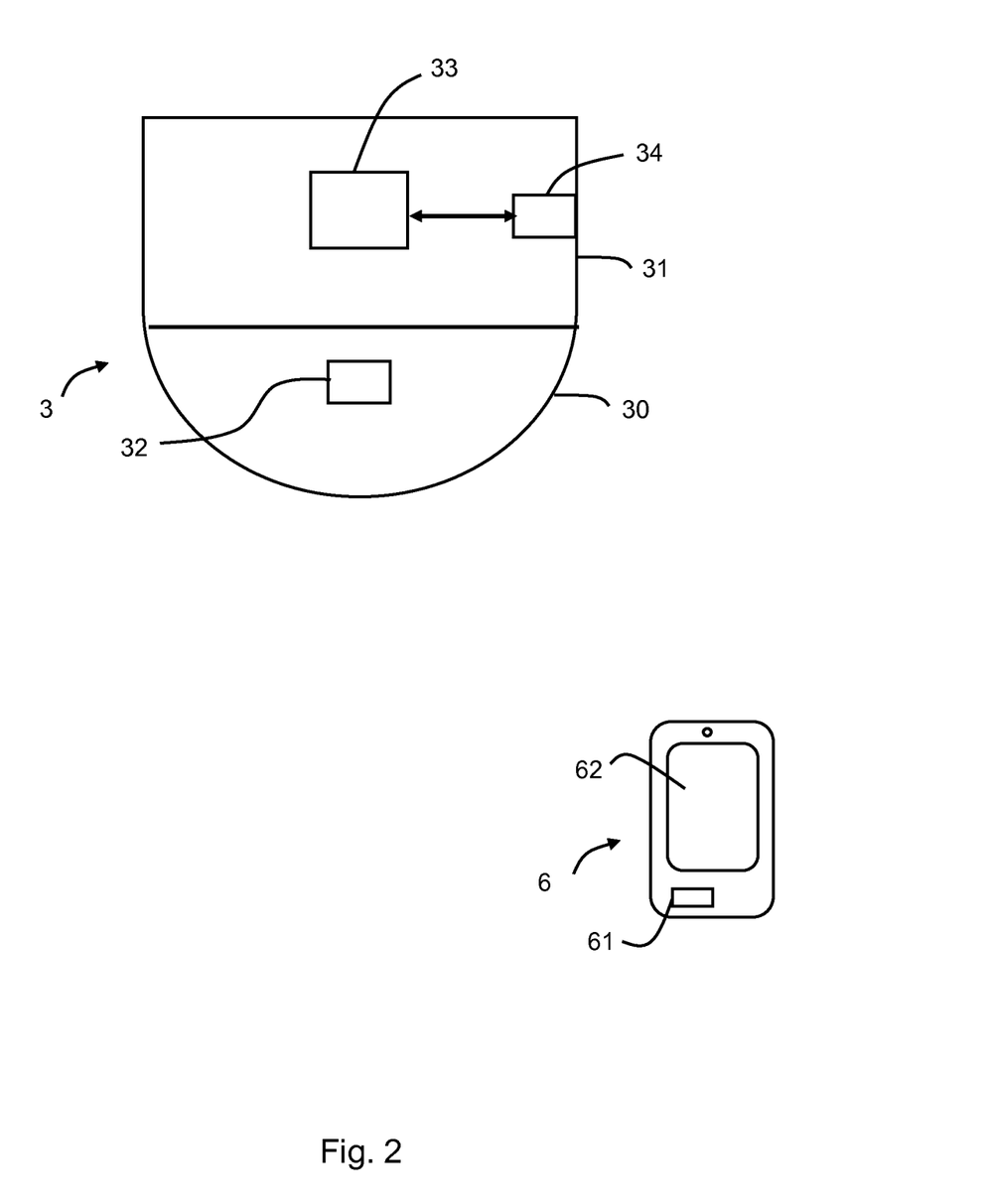
FIG. 2 shows schematically an example of a luminaire and a control device.

Details of an example of a luminaire 3 and a control device 6 are shown schematically in FIG. 2.

The luminaire 3 has a lamp portion 30 and a controller portion 31. The luminaire 3 may for example be for use in a home or office or public building or the like. The lamp portion 30 has at least one light source or lamp 32, such as an LED-based lamp, gas-discharge lamp or filament bulb, etc. The controller portion 31 has a controller 33 for controlling overall operation of the luminaire 3. As is known per se, the controller 33 may comprise one or more processors. The controller portion 31 has a wireless communications interface 34 which is in communication with the controller 33. It should be noted that the physical location of the various components is only indicated schematically in FIG. 2.

The wireless communications interface 34 provides for wireless communication with external devices and, optionally, other luminaires. The wireless communications interface 34 in this example includes the necessary circuitry to provide for wireless communications and an antenna (not shown). The wireless communications interface 34 in particular provides for wireless communication with a control device 6, which will be discussed further below. The wireless communication between the luminaire 3 and the control device 6 is convenient for users, installers, etc., as it means that a physical, wired connection to the luminaire 3 is not necessary. Nevertheless, wired connections may be used, instead of or in addition to wireless connections.

The control device 6 may be a portable device having at least a processor and wireless circuitry (shown schematically by the reference numeral 61) for communicating with the luminaire(s) 3. The control device 6 preferably has a screen 62. In addition to the wireless circuitry for communicating with the luminaire(s) 3 as mentioned above, the control device 6 may have cellular communications circuitry for enabling the control device 6 to communicate a via cellular network (such as for example a GSM (Group Special Mobile or 2G (second generation) network, a 3G network, or a 4G or LTE (Long Term Evolution) network, etc.). Alternatively or additionally, the control device 6 may have wired communications circuitry for enabling the control device 6 to communicate with a wired network. As mentioned, the control device 6 may be for example a smartphone, a laptop computer, a tablet computer, a personal digital assistant (PDA) or some other mobile computing device.

Using some controller, such as a control device 6, the user 4 is able to control the various luminaires 3 to control one or more of at least the brightness and the color/color temperature of the luminaire 3. Depending on the system and settings, the user 4 may be able to control each luminaire 3 independently or may control some or all of the luminaires 3 as a "group", applying a group setting across the luminaires 3 of the group.

A problem for users is that, with the increasing use of technology in and concerning lighting systems, it is difficult for a user to be aware of current new or replacement products which may improve the experience for the user, save costs, etc. (The term "product" used herein will often be used to include tangible or physical products, such as light sources or lamps, as well as intangible products, such as software. Accordingly, unless the context requires otherwise, the term "product" as used herein shall normally be construed to include physical (tangible) products as well as intangible products.)

Accordingly, in examples described herein, usage of the lighting system 2, in particular, usage of the luminaires 3 which make up the light emitting components of the lighting system 2, is monitored. In an example, the usage of the lighting system 2 is monitored by the server 20 which receives outputs one or more of the luminaires 3, the fixed control device 5 (if present) and the mobile control device 6 (if present), the outputs indicating usage of the lighting system 2 by the user 4. Examples of this will be discussed in more detail below. In addition, the context in which the lighting system 2 is used is monitored. In an example, the context in which the lighting system 2 is used is monitored by the server 20 which receives outputs from at least one or more of the sensors 9. Again, examples of this will be discussed in more detail below. The server 20 accesses the database 40. The server 20 selects a lighting system product from the database 40 in view of the determined usage of the lighting system 2 by the user 4. The server 20 then arranges for an indication of the selected lighting system product to be provided to the user 4. The indication may be provided to the user 4 by displaying details concerning the selected lighting system product on the screen 62 of the user's control device 6 or perhaps on the screen of a computer 8 used by the computer. The indication may alternatively or additionally be provided as an audio message played through the user's control device 6 or computer say. The indication may alternatively or additionally be provided in the form of a text (SMS or Short Messaging Service) message or email or the like delivered to the user 4.

In the sense used herein, "usage" of the lighting system 2 may include for example whether a particular luminaire 3 is switched on or off. As another example, usage of the lighting system may include the brightness level of light emitted by a particular luminaire 3 (i.e. whether the luminaire 3 is set to output a high or low level of light, and optionally a measure of the light flux that is output) that is set by a user. Moreover, particularly for more sophisticated lighting systems, usage of the lighting system 2 may include for example various other parameters concerning the light that is output by a particular luminaire 3, including for example hue, saturation, dynamics, beam width, etc.

In the sense used herein, the "context" in which the lighting system 2 is used relates to for example what the user 4 is doing, and/or where the user 4 is located, and/or whether other people are present, at the relevant time. A number of specific examples will be discussed below. But to illustrate this quickly, a user 4 may set a particular luminaire 3 to be at a low light level (one particular usage of the lighting system 2) but the context is very different for the cases where for example the user 4 is alone and perhaps watching television or where for example the user 4 has a number of guests present and may for example be hosting a party. The use of the various sensors 9 described herein enables the server 20 to assess the context in which the usage takes place.

By way of particular example, the context may relate to user activity. For example, the user activity may be eating, sleeping, reading, watching television, chatting, waiting, relaxing, concentrating, etc. As another example, the user activity may be usage of a computer or game console or the like. The user activity may in some cases be broadly categorized as physically active or physically inactive.

To enable the user activity to be determined, one or more of the sensors 9 may be one or more of the following:

1. presence sensors, such as passive infrared (PIR) sensors, ultrasound sensors, radar, near-field communication (NFC), microphones, cameras, gaze detectors, etc. Use of such sensors to detect the presence of a person, and to detect the number of people present, is known of itself and will not be described in more detail herein.
2. use actuators, such as door use contacts, weight sensors on furniture such as chairs or beds. Use of such sensors indicate whether a user is moving between rooms say, or is seated in a particular chair, or has gone to sleep say. Again, use of such sensors for detecting this kind of activity is known of itself and will not be described in more detail herein.
3. other sensors for user interaction, such as which other devices the user may be operating (such as computers, kitchen equipment, washing machines, heating and air conditioning controls, etc.), WiFi activity, etc. For example, a computer or games console 8 may be set to output signals for the server 20 to indicate that the user is using the computer 8 or playing a game on the games console.

By way of further example, the context may relate to the user location. This may be for example the particular room or zone in which the user is located or, more broadly, the geographic location of the user. Data concerning the location can be provided to the server from for example presence sensors that indicate where the user is located, from for example GPS (Global Positioning System) devices, etc.

By way of further example, the context may relate to the time, that is the (current) time of day and/or the time of year. Data concerning the time may already be available to the server, or may be provided in the form of for example time stamps or the like in data being transmitted to the sever 20 from the lighting system 2.

By way of yet another example, the context may relate to user presence. For example, data concerning the number of people present may be sent to the server 20 from the lighting system 2. As another example, the particular person or persons present may be identified (by for example a facial recognition system using a camera) and information concerning the user profile may be transmitted. This may be in for example broad terms, such as male or female; child, adult or elderly person; etc.

By way of yet another example, the context may relate to characteristics relating to the physical environment in which the user is located. This may include for example ambient light conditions, room size, wall or ceiling surface properties (which can affect the lighting effects that can be achieved), lighting infrastructure, etc. Depending on the characteristic, data relating to the characteristic may be obtained in real time (e.g. for ambient light conditions); may be obtained in advance and optionally transmitted to the server in advance (e.g. for wall or ceiling surface properties); and/or may be obtained from other sources (e.g. local weather reports).

As a final example, the context may relate to the focus vector of the user. This may be obtained using for example a camera, in a manner known per se. This helps determine if for example the user is concentrating on a particular task or activity, such as reading or watching television, etc.

To give a specific example to illustrate this, the server 20 may determine that a dimmable light source is set to a maximum quite often for a certain activity. This could indicate that a more powerful light source is preferred, or that further light sources should be added to the lighting system 3. Similarly, a dimmable light source might often be dimmed to the minimum level, e.g. to create a night light for a child's room at night time. This could indicate the need for a user to have a light source that can be set to a yet lower level of light output than the light source currently used in the lighting system 2.

As another specific example, the server 20 may determine that a user is attempting to select a color that cannot be rendered by a particular luminaire or combination of luminaires currently present in the lighting system 2. This could indicate that a different lamp or light source could be used by the user to obtain the desired color.

As one further specific example, the server 20 may determine that a user is leaving a particular lamp on standby for extended periods, and that therefore a different lamp that is more power-efficient for that type of usage could be used. Likewise, the server 20 may determine that a user is setting a particular lamp to a high level for extended periods, and that therefore again a different lamp that is more power-efficient for that type of usage could be used.

Other examples include: detecting that a computer game is being played and suggesting new lighting products that can improve the user's experience, such as different lamps that can be controlled to set the lighting colors flexibly to correspond to or complement the game being played; detecting activity concerning children and suggesting new products that are suitable for or directed at children; detecting that a certain movie is being viewed and suggesting corresponding lighting products or other merchandise relevant to the movie; detecting high stress levels for the user and suggesting mood relaxation lighting products; detecting disruption of a user's sleep pattern and suggesting a bright light option for therapy that can help restore the user's circadian rhythm; and detecting that a user is late in falling asleep (either in absolute terms or relative to a user's usual sleep pattern) and suggesting for example a light source with decreased blue content.

As mentioned, the server 20 accesses the database 40 to identify a relevant lighting system product from the database 40 in view of the usage of the lighting system 2 by the user 4. Moreover, the database 40 may be arranged in effect as a collection of "nodes" (i.e. the products, such as lamps/luminaires, etc.) and "pointers" (i.e. the advantage(s) of the products concerned). So, for example, a product is retrieved as a node, while color rendering is the desired output that cannot be provided in the system currently used by the user, and this advantage of the selected product can be indicated to the user. Accordingly, the indication that is provided may comprise an indication of the product itself and also the advantage(s) for the user over the user's current system and/or current products which the new or different product would provide.

The database 40 is updated continuously with details of new products. It may be noted that the products may be for example light sources that can enhance a lighting system, but also for example sensors and new user interaction options. The products may be for example new or updated software for the user's control device 6 and/or the lighting system 2 generally. The database 40 may be open in the sense that any manufacturer can contribute to the database 40. The manufacturers may add details of new products that are available. Moreover, for any product in the database, the manufacturers may indicate an alternative that is available from the manufacturer, together with a reason to select the alternative (for example a higher maximum light output, better white light, more colors available, etc.). It may also be possible for users to add their own ratings to the products listed in the database. The user ratings can for example confirm or question the listed alternatives and the reason identified for selecting the alternative. Alternatively or additionally, Web crawling software programs may be used to continuously explore websites and the like (e.g. online Web shops) in order to keep track of available lighting products.

It is in general important to suggest a new or replacement product to a user only at a time when the user might be receptive to receiving the suggestion, and therefore to do so without annoying the user. To achieve this, account may be taken of the current activity of the user and/or the context in which the usage of the lighting system 2 is taking place. In outline, the openness of the user to receive the recommendation can be derived from for example a schedule, the user's interaction pattern with a device, environmental sensors, on-body sensors, focus vectors, or a combination of these. Typically, the openness to receive a suggestion can be estimated based on the various inputs and captured in a score between 0 (not open to receive suggestion) and 1 (very open to receive suggestion). A threshold (e.g. 0.8) can be defined above which the recommendation is presented to the user. This threshold can be set and/or adapted by a user or automatically changed based on user's feedback on the timeliness of the received suggestions.

In more detail, as a first example, a schedule might be determined that defines when the user is more open to receive a recommendation. For example, a light option improvement recommendation might always be scheduled for weekends, for evenings (when it is dark), or at less busy moments of the day (e.g. after dinner). The "proposition" schedules can be predetermined by a user or a lighting service provider based on knowledge of regular daily routines. Information in a user's digital calendar may be used to avoid propositions in busy or occupied time slots. This schedule can be tailored over time to take into account to the actual appreciation of propositions in the past, for example whether the user did proceed to purchase a product that was recommend, so as to provide a learning system which adapts to its users.

As a second example, the user's interaction with the control device 6 and/or some other computer or games console or the like can be analyzed to determine the best moment to provide the proposition. If for example a user is using an app that requires active attention (e.g. reading a story with some eBook application), it can be inferred that the user prefers not to be disturbed by a lighting recommendation. If on the other hand the user opens an app that is specifically for controlling operation of the lighting system or that is a shopping app, this can be inferred to be an appropriate moment to recommend new light options. Similarly, if a user is exploring various light scenes using the control device 6 and is trying them out, then again these user might be open to receiving a recommendation. Indeed, this can be more detailed or "granular", in the sense that if the user is interacting in a particular way with the control device 6, then the user be open to receiving a suggestion for a new light interaction device or software, but not necessarily a particular other lighting product. Similarly, the system could have knowledge of user's interaction with other smart devices. For example, if a user is watching a movie on a smart TV and pauses the movie, this might be determined to be a good time to provide a light proposition.

As a third example, the user's control device 6 may have a microphone, or one or more of the sensors 9 may be a microphone, to pick up specific keywords that indicate a user's wish or intention. If for example a user makes a remark about the light, or is having an (open-minded) discussion about light scenes with others, this can indicate that it is a good time to present a light setting suggestion.

As a fourth example, environmental sensors may be used. As a specific example, the activity of a user in a room might be monitored with a motion sensors. When there is a high degree of motion in the room, it may be inferred that the user is busy and not open to receive a light proposition. But when there a low amount of motion detected, it may be inferred that the user is relaxing or not very active and more open to receive a proposal.

As a fifth example, one or more cameras and/or gaze detectors may be present installed in the room 1 to detect the user's the focus vectors. When the focus is rather static and directed to a location with a lot of light, the user is probably concentrating on a particular task and not open to interruption. When the focus is directed to a luminaire or lamp, there is a high probability that the user is evaluating the lighting infrastructure and might be open to an upgrade suggestion.

As a sixth example, on-body sensors may be used. Users might for example have a wearable device that measures physiological signals indicative of arousal or stress levels, including blood pressure, heart rate, and galvanic skin response. In the case of high levels of arousal or stress, users are considered not to be open to receive a lighting recommendation. The amount of pupil dilation (which can be measured by an appropriate on-body sensor, such as smart glasses or a camera) might indicate a need for higher light levels and an optimal moment to propose options for this.

As a final example for this, the presence or not of multiple users may be used. When multiple people are present, or when unknown people are present (e.g. guests of the family), it is less likely that this group of people is open for recommendations on the lighting.

When one or more of the requirements discussed above are met, the proposition will be presented to the user. The proposition can be a description of the need for or potential gain from using a new product and a list of possible products to achieve the improvement options. The presentation can vary from simple (e.g. merely proposing the new product with a bare outline of the product's features) to very elaborate, including for example providing renderings of the current situation and the new situation that can be achieved with a new product, which may be displayed on the user's control device 6 for example.

Users can accept the proposal by selecting the suggested light system improvement or reject the proposal by not selecting/cancelling/ignoring the recommendation. At this moment the recommender system can also learn from the user(s) what it could not detect automatically.

Figure 3:
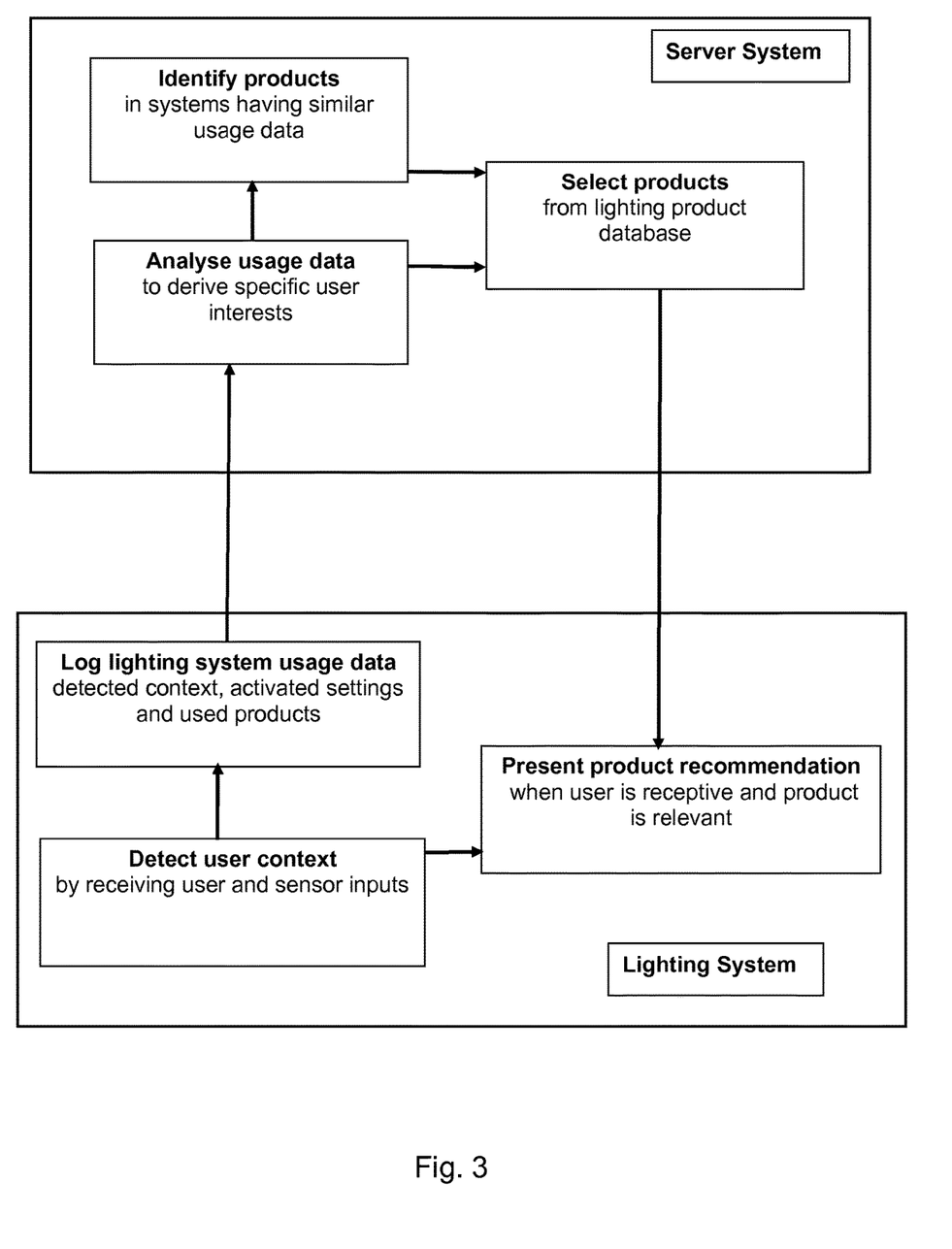
FIG. 3 shows a schematic overview of the various steps of an example of the method described herein.

In FIG. 3 there is shown a schematic overview of the various steps of an example of the method described herein. As mentioned, some steps of the method may be executed as part of a local connected lighting system. For instance, detecting the user context, and logging all relevant lighting system related events such as activated light settings, usage data of individual lighting products, etc., may be carried out locally. Some other steps would typically run on a remote server system, which may gather and aggregate usage data from a plurality of individual lighting systems, and, based on this, can learn which products are typically used in specific contexts (e.g. during dinner) or for specific light settings (e.g. a wake up light setting). The server system may apply learning methods or "collaborative filtering" algorithms in order to detect lighting systems and/or lighting usage data which is highly similar to the system or usage of a particular user. The system can then check which products which are frequently used or highly appreciated by similar users.

Next, the server system sends this information to a local lighting system or a smart device associated with the local lighting system in order to present a specific product recommendation or product offer to the user. The product recommendation can range from presenting an individual product offer, presenting a discount coupon, to presenting a complete package deal comprising multiple products together (e.g. a bathroom ambience solution comprising a bathroom mirror lamp, an LED strip for the bath, and a waterproof control device). The recommendation can be visually presented on for example the control device 6 associated with the locally lighting system, such as a smartphone or tablet, by showing both the product and its possible behaviors or effects. The recommendation can also be proposed in a spoken dialogue via for example the control device 6.

Figure 4:
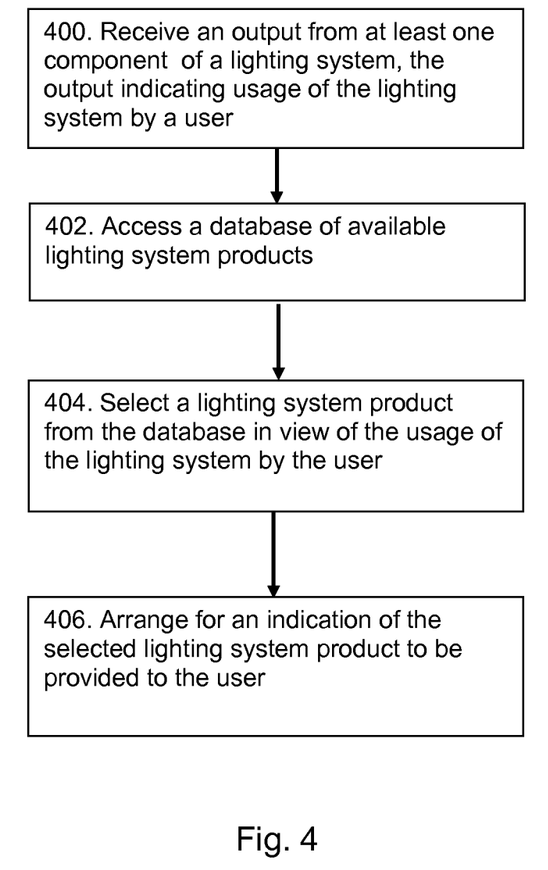
FIG. 4 shows schematically a method as described herein.

Referring now to FIG. 4, there is shown schematically a method as described herein. At 400, an output from at least one component of a lighting system is received, the output indicating usage of the lighting system by a user. At 402, a database of available lighting system products is accessed. At 404, a lighting system product is selected from the database in view of the usage of the lighting system by the user. At 406, an indication of the selected lighting system product to be provided to the user is arranged.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of monitoring usage of a lighting system using apparatus comprising a processor, the method comprising:
   the processor receiving an output from at least one component of a lighting system, the output indicating usage of the lighting system by a user;
   the processor accessing a database of available lighting system products;
   the processor selecting a lighting system product from the database in view of the usage of the lighting system by the user and to provide a more power-efficient usage of the lighting system; and
   the processor arranging for an indication of the selected lighting system product to be provided to the user, the usage of the lighting system being configured to indicate that the user frequently sets a light source dimmer control of a light source to a maximum or a minimum setting, or that the user is attempting to select a color to be rendered by the lighting system that is not a color that can be rendered by the lighting system, the indication being configured to provide a light source that generates a greater maximum output or a lesser minimum output that the lighting system used by the user was not able to provide, respectively, or the indication is configured to provide the user a light source that will allow the selected color to be rendered that the lighting system used by the user was not able to render, respectively, and the indication being configured to communicate to the user the indicated light source can generate a greater maximum output or a lesser minimum output, respectively, or can render the selected color, respectively, based on the usage of the lighting system.

2. A method according to claim 1, wherein the component comprises at least one of a luminaire, a lamp on/off controller, a lamp dimmer controller and a lamp color controller.

3. A method according to claim 1, comprising the processor receiving data concerning the context in which the usage of the lighting system takes place.

4. A method according to claim 3, wherein the data concerning the context in which the usage of the lighting system takes place comprises at least one of user activity, number of users present, user location, time of day, and focus vector of the user.

5. A method according to claim 3, comprising the processor determining a time when to provide the indication to the user on the basis of at least the data concerning the context in which the usage of the lighting system takes place, the processor arranging for the indication of the selected lighting system product to be provided to the user at the determined time.

6. Apparatus for monitoring usage of a lighting system, the apparatus comprising a processor arranged to:
   receive an output from at least one component of a lighting system, the output indicating usage of the lighting system by a user;
   access a database of available lighting system products;
   select a lighting system product from the database in view of the usage of the lighting system by the user and to provide a more power-efficient usage of the lighting system; and
   arrange for an indication of the selected lighting system product to be provided to the user, the usage of the lighting system being configured to indicate that the user frequently sets a light source dimmer control of a light source to a maximum or a minimum setting, or that the user is attempting to select a color to be rendered by the lighting system that is not a color that can be rendered by the lighting system, the indication being configured to provide a light source that provides a greater maximum output or a lesser minimum output that the lighting system used by the user was not able to provide, respectively, or the indication is configured to provide the user a light source that will allow the selected color to be rendered that the lighting system used by the user was not able to render, respectively, and the indication being configured to communicate to the user the indicated light source can generate a greater maximum output or a lesser minimum output, respectively, or can render the selected color, respectively, based on the usage of the lighting system.

7. Apparatus according to claim 6, the processor being arranged to receive data concerning the context in which the usage of the lighting system takes place.

8. Apparatus according to claim 7, the processor being arranged to determine a time when to provide the indication to the user on the basis of at least the data concerning the context in which the usage of the lighting system takes place, the processor arranging for the indication of the selected lighting system product to be provided to the user at the determined time.

9. Apparatus according to claim 6, wherein the database is arranged as a collection of lighting system products, and each product of the collection of lighting system products has one or more advantages based on the usage of the lighting system by the user and configured to be communicated to the user in the indication.

10. A method of monitoring usage of a lighting system using apparatus comprising a processor, the method comprising:
   the processor receiving an output from at least one component of a lighting system, the output indicating usage of the lighting system by a user;
   the processor accessing a database of available lighting system products;
   the processor selecting a lighting system product from the database in view of the usage of the lighting system by the user and to provide a more power-efficient usage of the lighting system; and
   the processor arranging for an indication of the selected lighting system product to be provided to the user, the usage of the lighting system being configured to indicate that the user frequently sets a light source dimmer control of a light source to a maximum or a minimum setting, the indication being configured to provide a light source that generates a greater maximum output or a lesser minimum output that the lighting system used by the user was not able to provide, respectively, and the indication being configured to communicate to the user the indicated light source can generate a greater maximum output or a lesser minimum output, respectively, based on the usage of the lighting system.

11. A method of monitoring usage of a lighting system using apparatus comprising a processor, the method comprising:
   the processor receiving an output from at least one component of a lighting system, the output indicating usage of the lighting system by a user;
   the processor accessing a database of available lighting system products;
   the processor selecting a lighting system product from the database in view of the usage of the lighting system by the user and to provide a more power-efficient usage of the lighting system; and
   the processor arranging for an indication of the selected lighting system product to be provided to the user, the usage of the lighting system being configured to indicate that that the user is attempting to select a color to be rendered by the lighting system that is not a color that can be rendered by the lighting system, the indication is configured to provide the user a light source that will allow the selected color to be rendered that the lighting system used by the user was not able to render, and the indication being configured to communicate to the user the indicated light source can render the selected color based on the usage of the lighting system.

* * * * *